United States Patent [19]

Allmandinger et al.

[11] Patent Number: 4,630,506

[45] Date of Patent: Dec. 23, 1986

[54] DRIVE AXLE AND METHOD OF ASSEMBLING SAME

[75] Inventors: Donald D. Allmandinger; Richard L. Pifer, both of Fort Wayne, Ind.

[73] Assignee: Dana Corporation, Toledo, Ohio

[21] Appl. No.: 679,004

[22] Filed: Dec. 6, 1984

[51] Int. Cl.$^4$ .............................................. F16H 1/40
[52] U.S. Cl. ........................................ 74/713; 29/434; 29/453; 74/710.5; 403/315; 403/371
[58] Field of Search ............ 74/710.5, 711, 713; 29/434, 453, 229; 403/371, 372, 221, 315, 316, 243, 261, 326

[56] References Cited

U.S. PATENT DOCUMENTS

| | | | |
|---|---|---|---|
| 2,489,864 | 12/1949 | Cravener | 403/326 X |
| 3,224,299 | 12/1965 | Holdeman et al. | 74/711 |
| 3,347,083 | 10/1967 | Turpin et al. | 29/229 X |
| 3,439,944 | 4/1969 | Leutenegger | 403/326 X |
| 3,527,120 | 9/1970 | Duer et al. | 74/711 |
| 3,624,717 | 11/1971 | Brubaker | 74/711 |
| 3,628,399 | 12/1971 | Seitz et al. | 74/711 |
| 3,853,022 | 12/1974 | Duer | 74/713 |
| 3,864,992 | 2/1975 | Lovdahl | 74/711 |
| 4,182,201 | 1/1980 | Mayhew et al. | 74/713 |
| 4,210,033 | 7/1980 | Erikson et al. | 74/441 X |
| 4,455,889 | 6/1984 | Hauser | 74/713 |
| 4,513,633 | 4/1985 | Goscenski | 74/710.5 X |

FOREIGN PATENT DOCUMENTS 2086498  5/1982  United Kingdom ................ 74/713

*Primary Examiner*—Leslie A. Braun
*Assistant Examiner*—Dwight G. Diehl
*Attorney, Agent, or Firm*—Robert M. Leonardi; Robert H. Johnson

[57] ABSTRACT

A high ratio semi-floating drive axle is disclosed. The axle includes a pair of axle shafts which are prevented from pulling out of the differential side gears by retainer ring assemblies which engage grooves around the axle shafts and are held in the grooves by snap rings which encircle the retainer ring assemblies.

12 Claims, 7 Drawing Figures

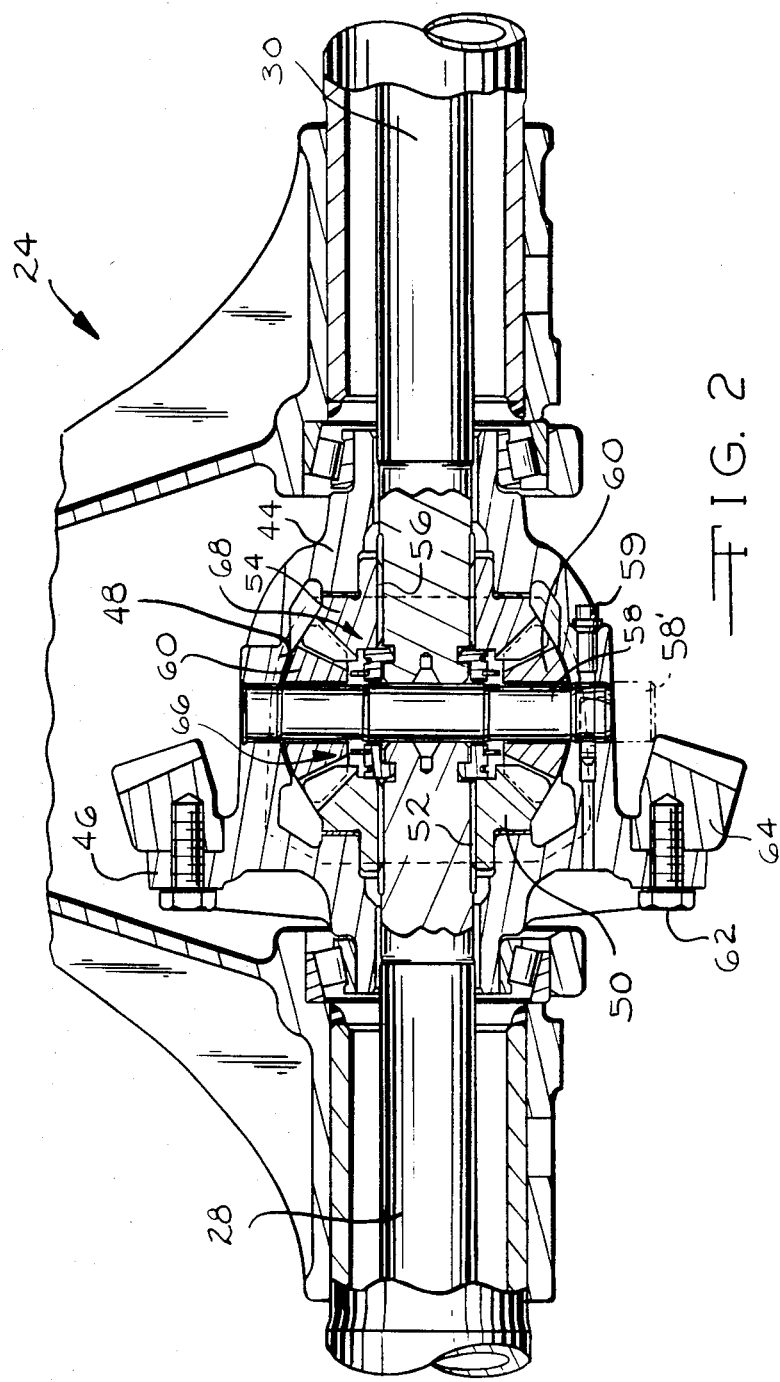

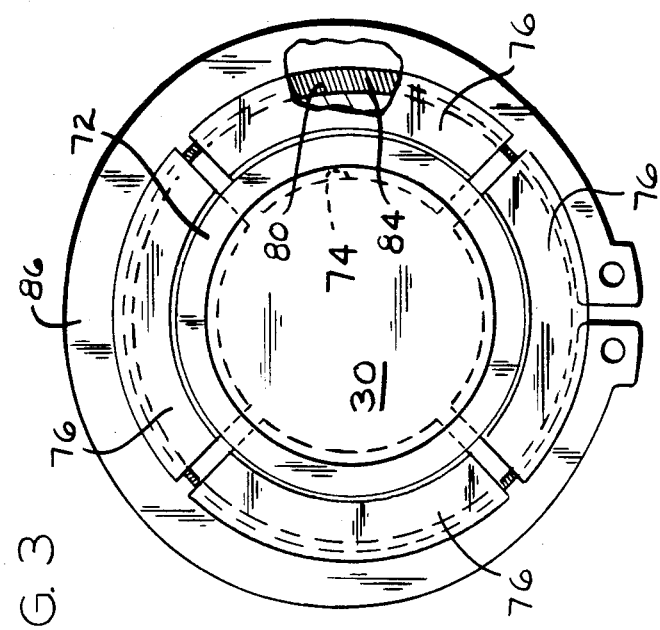
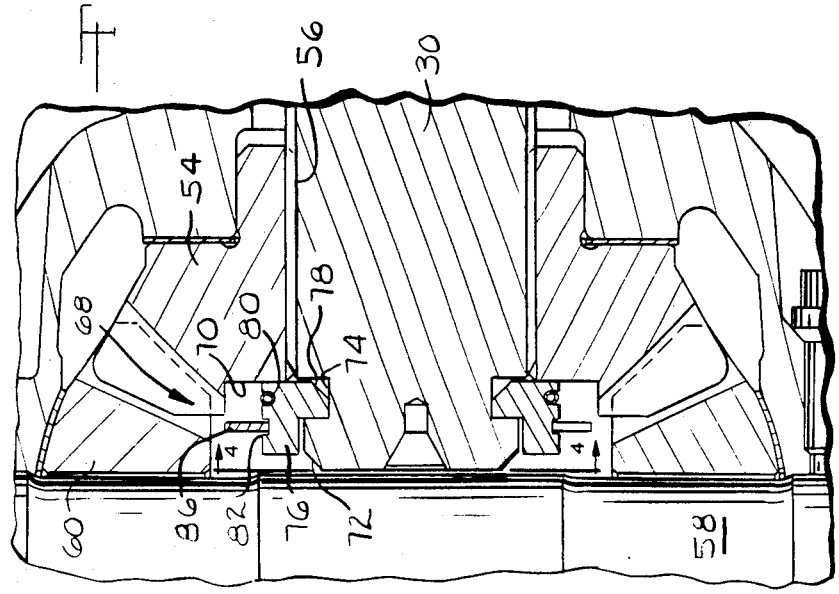

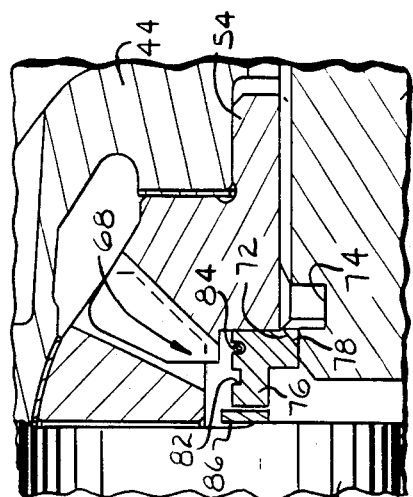
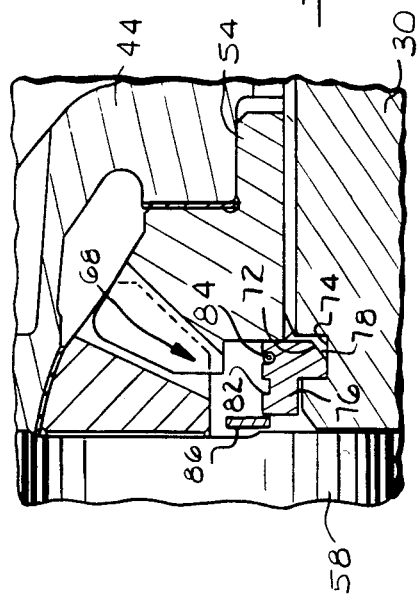
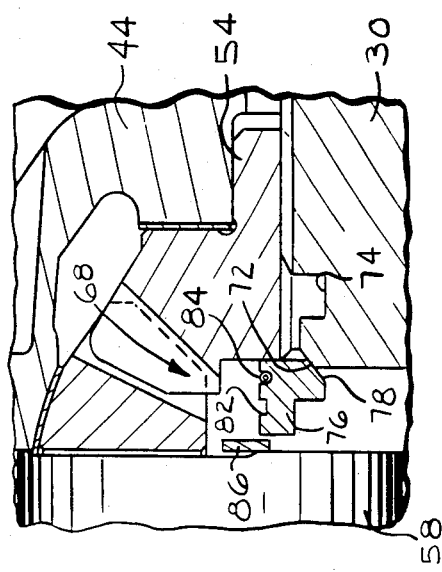

DRIVE AXLE AND METHOD OF ASSEMBLING SAME

BACKGROUND OF THE INVENTION

This invention relates to drive axles, and more specifically to semi-floating axles which have axle shafts journaled for rotation at the outboard end by bearings inside the axle housing.

Semi-floating drive axles are well-known and are lighter and less expensive than full-floating drive axles which have the axle shafts journaled for rotation at the outboard end by bearings outside the axle housing. However, with semi-floating axles it is necessary to provide some retaining structure to prevent the axle shafts from pulling out of the differential side gears during cornering. (The full-floating drive axle does not have this problem because the bearing arrangement prevents the axle shafts from pulling out of the side gears.)

In drive axles having a low ratio, e.g., 2.5 to 1, the axle shafts are prevented from pulling out of the side gears by having for each axle shaft a C-shaped clip or retainer which is placed in a groove around the axle shaft and is larger than the splined opening in the side gear through which the axle shaft extends. In order to assemble this construction, it is necessary to remove the pinion shaft from the differential cage, place the C-shaped clips in the grooves around the axle shafts and then replace the pinion shaft.

The construction and method of assembly described above for low ratio axles cannot be used with drive axles having a high ratio, such as 6 to 1. The reason is that the ring gear which is fastened to the differential cage must extend further out in order to mesh with the input pinion gear which has been reduced in diameter to provide the higher ratio, and the further extension of the ring gear causes it to overlie the pinion shaft, thereby preventing its removal from the differential cage.

Our invention overcomes the problem described above by providing a construction and method of assembly for preventing axle shafts from pulling out of side gears during cornering which does not require removal of the differential pinion shaft during assembly.

BRIEF SUMMARY OF THE INVENTION

This invention relates to a high ratio drive axle in which the axle shafts are prevented from pulling out of the differential side gears by retainer ring assemblies. Each retainer ring assembly is located in a groove around an axle shaft and includes a plurality of segments which are resiliently biased into the groove in the axle shaft by a spring encircling the segments. A snap ring also encircles the segments and prevents them from coming out of the groove in which they are disposed.

It is a principal object of our invention to provide a semi-floating drive axle which can be assembled without the need to remove the differential pinion shaft.

Another object of our invention is to provide a method of assembling a high ration semi-floating drive axle.

The above and other objects, features and advantages of our invention will become apparent upon consideration of the detailed description and appended drawing.

BRIEF DESCRIPTION OF THE DRAWING

FIG. 2 is an enlarged longitudinal section of the differential portion of the axle shown in FIG. 1, FIG. 3 is a fragmentary section showing to advantage the retainer ring assembly, FIG. 4 is a section taken along line 4—4 in FIG. 3, and FIGS. 5, 6 and 7 are fragmentary views showing in sequence the insertion of the axle shaft into the side gear and engagement of the retainer ring assembly with the groove.

DETAILED DESCRIPTION OF THE PREFERRED EMBODIMENT

Figure 1:
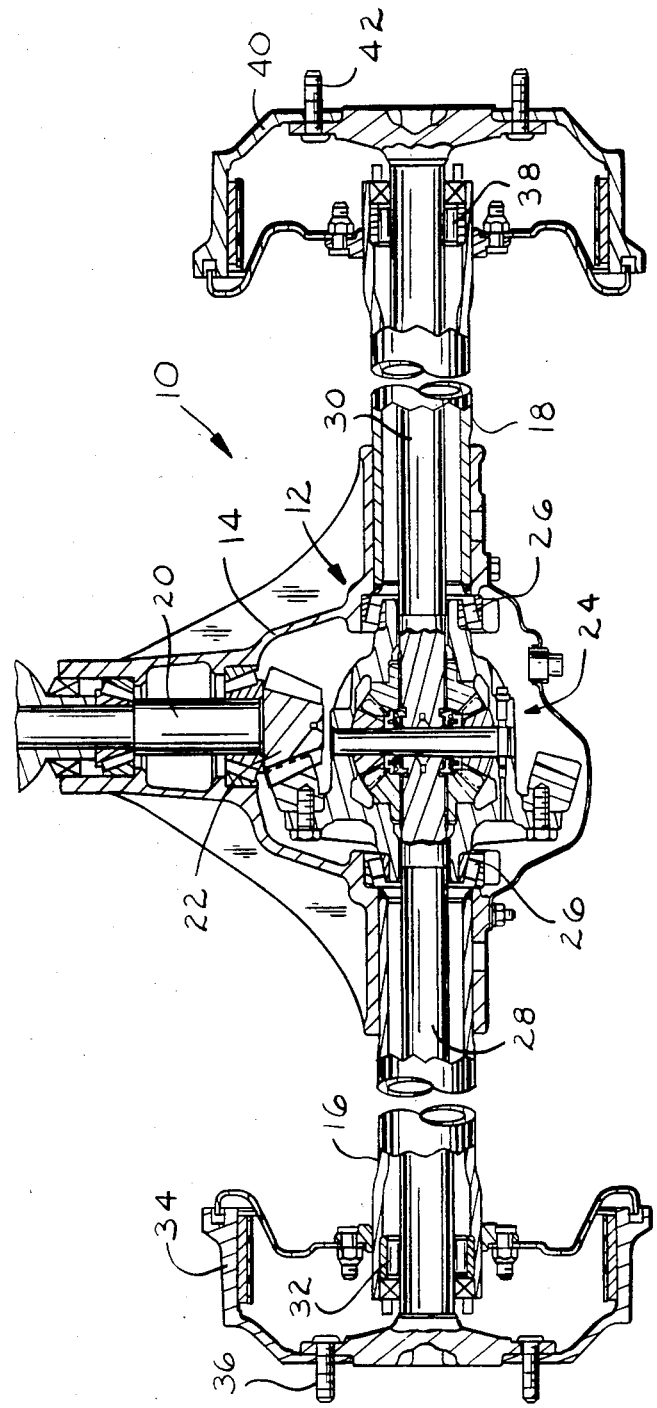
FIG. 1 shows a high ratio semi-floating drive axle embodying our invention.

Referring to FIG. 1, reference numeral 10 denotes a high ratio semi-floating drive axle which includes an axle housing 12. Housing 12 includes an enlarged portion 14 and a pair of coaxially extending arms or tubes 16 and 18. Journaled for rotation in enlarged portion 14 of axle housing 12 is an input shaft 20 which has integral with it a pinion gear 22. Disposed in enlarged portion 14 of housing 12 is an epicyclic gear differential 24 which is journaled for rotation in housing 12 by a pair of bearings 26. Extending outwardly from differential 24 along arms 16 and 18 is a pair of axle shafts 28 and 30. Axle shaft 28 is rotatably journaled at its ouboard end in arm 16 by a bearing 32. Also, axle shaft 28 carries at its outboard end a brake drum 34 which includes a plurality of threaded studs 36 for attaching a wheel and tire assembly, not shown, thereto. Similarly, axle shaft 30 is journaled for rotation at its outboard end in arm 18 by a bearing 38 and includes a brake drum 40 which carries a plurality of threaded studs 42 for fastening a wheel and tire assembly, not shown, to brake drum 40.

Referring now to FIG. 2, it will be seen that differential 24 includes a cage 44 which has a flange 46 and a pair of openings 48, only one of which is shown. Disposed in cage 44 and journaled for rotation is a side gear 50 with a splined opening 52 and a side gear 54 with a splined opening 56.

A pinion shaft 58 is mounted in cage 44 and held in place by a threaded pin 59. Shaft 58 carries a pair of pinion gears 60 which are mounted for rotation and mesh with side gears 50 and 54.

Attached to flange 46 by a plurality of machine screws 62 is a ring gear 64 which meshes with input pinion gear 22. Because axle 10 has a high ratio the diameter of pinion gear 22 is relatively small, and so for ring gear 64 to be able to mesh with pinion gear 22 it is necessary for ring gear 64 to extend further axially than would be the case with a differential having a low ratio, such as 2.5 to 1. As is indicated by the dotted outline 58' it is clear that with a ring gear having an axial extention such as shown in FIG. 2 it is not possible to remove pinion shaft 58 from its mounting in cage 44 after ring gear 64 is attached to flange 46 by machine screws 62.

The inboard ends of axle shafts 28 and 30 are splined so that when the axle shafts are inserted in openings 52 and 56, respectively, axle shaft 28 is connected to side gear 50 for conjoint rotation and axle shaft 30 is connected to side gear 54 for conjoint rotation. Axle shaft 28 is prevented from being pulled out of side gear 50 by a retainer ring assembly 66 and similarly axle shaft 30 is prevented from being pulled out from side gear 54 by a retainer ring assembly 68.

Referring additionally to FIGS. 3 and 4, the construction of retainer ring assembly 68 will be described in detail as well as its cooperation with side gear 54 and axle shaft 30.

It will be noted that side gear 54 includes a recess 70 and that axle shaft 30 includes a chamfer 72 at the inboard end thereof and a groove 74 around it adjacent the end. With retainer ring assembly 68 disposed in groove 74 and extending axially outwardly far enough to engage recess 70 in side gear 54, removal of axle shaft 30 from side gear 54 is effectively prevented.

Retainer ring assembly 68 includes a plurality of arcuate segments 76, each segment 76 having a chamfer 78 on the inner perimeter and a pair of parallel grooves 80 and 82 along the outer perimeter thereof. Assembly 68 also includes a tension spring 84 disposed in grooves 80 which serves to hold assembly 68 together prior to and during the process of positioning assembly 68 in groove 74. A resilient steel ring or snap ring 86 is disposed in grooves 82 after retainer ring assembly 68 is disposed in groove 74 in order to prevent disengagement of retainer ring assembly 68 from grooves 74 due primarily to centrifugal force during operation of drive axle 10.

Retainer ring assembly 66 and its relationship with axle shaft 28 is identical with assembly 68 and axle shaft 30, and so will not be described in further detail.

We will now describe, referring particularly to FIGS. 5 through 7, the method of assembling retainer ring assembly 68 and axle shaft 30 so that axle shaft 30 is prevented from being pulled out of side gear 54 during vehicle cornering. It will be understood, of course, that the method for assembling retainer ring assembly 66 and side gear 28 is identical, so any explanation of such assembly is unnecessary.

Retainer ring assembly 68 and snap ring 86 are inserted through opening 48 in cage 44 into the space between pinion shaft 58 and side gear 54, with snap ring 86 being closest to pinion shaft 58. Retainer ring assembly 68 and snap ring 86 are then maintained in substantially coaxial alignment with splined opening 56 and side gear 54. Axle shaft 30 then is pushed through splined opening 56 so that chamfer 72 on the inboard end of axle shaft 30 engages chamfer 78 on the inner perimeter of the segments 76 of retainer ring assembly 68. This position of parts is shown by FIG. 5. Further inward movement of shaft 30 causes retainer ring assembly 68 to expand to a maximum expansion, as shown in FIG. 6. Additional inward movement of axle shaft 30 then permits segments 76 of retainer ring assembly 68 to retract into groove 74, as shown by FIG. 7. After retainer ring assembly 68 is seated in groove 74, snap ring 86 is expanded and placed over retainer ring assembly 68 and then permitted to contract to engage grooves 82, as shown by FIG. 3.

At this point it will be seen that with the construction and method described above it is possible to assemble retainer ring assemblies 66 and 68 and axle shafts 28 and 30 without having to remove pinion shaft 58 from differential cage 44.

While only a single embodiment of our invention has been described, it will be understood that various modifications can be made to our invention without departing from the spirit and scope of it. Therefore, the limits of our invention should be determined from the appended claims.

We claim:

1. In an axle assembly, the combination comprising:
a differential cage,
a pair of side gears disposed in said cage, each side gear having a splined opening,
a pinion shaft mounted in said cage,
a pair of pinion gears rotatably journaled on said pinion shaft and meshing with said side gears,
a ring gear fastened to said cage and disposed to at least partially overlie said pinion shaft so that said pinion shaft cannot be removed from said cage after said ring gear is fastened to said cage,
a splined axle shaft having a groove adjacent one end, said axle shaft being disposed to extend through and engage the splined opening in one of said side gears so that said one end is adjacent said pinion shaft,
a plurality of separate and independent retainer ring segments disposed in said groove and engaging the adjacent side gear, and
means resiliently holding said segments in said groove.

2. The combination as set forth in claim 1 wherein said holding means includes a spring encircling said segments.

3. The combinations as set forth in claim 1 wherein said holding means includes a snap ring encircling said segments.

4. The combination as set forth in claim 2 wherein said holding means includes a snap ring encircling said segments.

5. The combination as set forth in claim 1 wherein each retainer ring segment includes a first groove and a second groove, and said holding means includes a spring disposed in said first grooves and encircling said segments and a snap ring disposed in said second grooves and encircling said segments.

6. The combination as set forth in claim 5 wherein said retainer ring segments comprise means for engaging said side gear when said retainer ring segments are positioned in said axle shaft groove to prevent said axle shaft from being removed from said axle assembly.

7. The combination as set forth in claim 6 wherein said expandable ring has an inside diameter smaller than the inside diameter of said axle shaft groove.

8. The combination as set forth in claim 7 wherein each of said retainer ring segments includes a generally radially extending face adapted for engagement with a radial face of a next adjacent retainer ring segment when said expandable ring is in a collapsed condition, whereby said expandable ring is held in an annular shape prior to assembly by said spring encircling said segments.

9. The combination as defined in claim 8 wherein a radially inward portion of each of said retainer ring segments defines a first chamfer and wherein a radially outward portion of the axially inward end of said axle shaft defines a second chamfer for engaging said first chamfers during assembly, whereby said second chamfer cams said retainer ring segments radially outwardly during assembly to allow said retainer ring segments to engage said axle shaft groove.

10. The combination as set forth in claim 9 wherein each of said plurality of retainer ring segments are identical.

11. An axle assembly comprising:
an axle housing having an enlarged portion and a pair of arms,
a differential disposed in the enlarged portion of said housing, said differential including:
a differential cage, a pair of side gears disposed in said cage, each side gear having a splined opening, a pinion shaft mounted in said cage, a pair of pinion gears rotatably journaled on said pinion shaft and meshing with said side gears, and a ring gear fastened to said cage and disposed to at least partially overlie said pinion shaft so that said pinion shaft cannot be removed from said cage after said ring gear is fastened to said cage, a pair of splined axle shafts, each axle shaft having a groove adjacent one end and each axle shaft being disposed to extend through and engage the splined opening in separate ones of said side gears so that said one end is adjacent said pinion shaft, the other end of each axle shaft being rotatably journaled in separate ones of said arms, and a pair of retainer ring assemblies, each assembly being disposed in separate ones of said grooves and engaging the adjacent side gear to prevent withdrawal of said axle shafts from the splined openings in said side gears, each assembly including a plurality of separate and independent retainer ring segments and means resiliently holding said segments in one of said grooves.

12. The axle assembly as set forth in claim 11 wherein each holding means includes first and second grooves in the retainer ring segments of each retainer ring assembly, a spring engaging said first grooves and encircling said segments and a snap ring engaging said second grooves and encircling said segments.

* * * * *